(12) United States Patent
Machida et al.

(10) Patent No.: US 6,678,604 B2
(45) Date of Patent: Jan. 13, 2004

(54) FUEL INJECTION CONTROL APPARATUS

(75) Inventors: Kenichi Machida, Saitama (JP);
Yoshiaki Hirakata, Saitama (JP);
Tomomi Yuhara, Saitama (JP);
Masahiko Abe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 245 days.

(21) Appl. No.: 09/874,995

(22) Filed: Jun. 7, 2001

(65) Prior Publication Data

US 2002/0010539 A1 Jan. 24, 2002

(30) Foreign Application Priority Data

Jun. 7, 2000 (JP) ........................ 2000-171051
Apr. 23, 2001 (JP) ........................ 2001-124481

(51) Int. Cl.$^7$ .............................................. F02D 41/18
(52) U.S. Cl. .................. 701/104; 123/478; 477/111
(58) Field of Search ............... 701/104, 102, 701/110, 113; 123/478, 480; 477/111

(56) References Cited

U.S. PATENT DOCUMENTS

| 4,545,355 A | * 10/1985 | Takao et al. ................. 123/674 |
| 4,697,421 A | * 10/1987 | Otobe et al. .................... 60/602 |
| 5,549,092 A | * 8/1996 | Hasegawa et al. ........... 123/478 |
| 5,649,518 A | * 7/1997 | Maki et al. .................. 123/682 |
| 5,781,875 A | * 7/1998 | Maki et al. .................. 701/104 |

FOREIGN PATENT DOCUMENTS

| JP | 4-54238 | * 2/1992 | ........... F02D/41/04 |
| JP | 4342857 | 11/1992 | |

\* cited by examiner

Primary Examiner—Hieu T. Vo
(74) Attorney, Agent, or Firm—Birch, Stewart, Kolasch & Birch, LLP

(57) ABSTRACT

To allow an engine having an intake duct for drawing running air to produce a high output by performing appropriate fuel injection depending on dynamic pressure variations. A vehicle speed corrective coefficient calculator calculates a fuel corrective coefficient KVPLS based on a vehicle speed VPLS, and a throttle corrective coefficient calculator calculates a corrective coefficient KVθTH based on a throttle opening θTH. A corrective coefficient multiplier multiplies the fuel corrective coefficient KVPLS and the corrective coefficient KVθTH, thus calculating a vehicle speed fuel adjustment corrective coefficient KVAF. An injection time calculator calculates a basic injection time TiM based on the throttle opening θTH and an engine rotational speed Ne, and also calculates a fuel injection time Ti by reading the vehicle speed fuel adjustment corrective coefficient KVAF and correcting the basic injection time TiM. When the engine rotational speed Ne is equal to or higher than a predetermined value Ne1 and also when the transmission is shifted to a low gear position, a corrective coefficient KVAF signal is applied to the injection time calculator.

20 Claims, 4 Drawing Sheets

26: VEHICLE SPEED CORRECTIVE COEFFICIENT CALCULATOR
27: THROTTLE CORRECTIVE COEFFICIENT CALCULATOR
28: CORRECTIVE COEFFICIENT MULTIPLIER

FUEL INJECTION CONTROL APPARATUS

BACKGROUND OF THE INVENTION

1. Field of the Invention

The present invention relates to a fuel injection control apparatus. In particular, the present invention relates to a fuel injection control apparatus for controlling a basic injection quantity of fuel in view of a change in an amount of intake air due to running air.

2. Description of Background Art

In fuel injection control apparatus for calculating a basic injection quantity of fuel from a rotational speed of an engine and a throttle opening, it is known to introduce running air through an intake duct that is open in the direction of travel of a motor vehicle as a means for increasing the torque and horsepower of the engine. For example, an engine control apparatus disclosed in Japanese Patent Laid-open No. 4-342857 determines an engine control quantity, i.e., a fuel injection quantity and a dynamic pressure due to running air introduced from an intake duct that is open in order to introduce the running air. Specifically, in a region where the dynamic pressure is large, i.e., in a region of high vehicle speed or large throttle opening, an incremental fuel quantity correction is carried out depending on the dynamic pressure. The dynamic pressure may be calculated directly by the dynamic pressure detecting means or indirectly from the speed of the vehicle.

The above background art control apparatus determines an engine control quantity that serves as a reference when the dynamic pressure is "0", and corrects the engine control quantity at the dynamic pressure of "0" depending on the dynamic pressure when the dynamic pressure is higher than "0." In order to determine an engine control quantity when the dynamic pressure is "0", it is necessary to remove the intake duct and set a reference engine control quantity. However, since air is drawn under different resistances when the intake duct is removed and when the intake duct is attached, it is not possible to accurately set a reference engine control quantity in the control apparatus according to the background art.

SUMMARY OF THE INVENTION

The present invention has been made to solve the above objects. Accordingly, it is an object of the present invention to provide a fuel injection control apparatus which is capable of determining a fuel injection quantity as an engine control quantity in view of a dynamic pressure without setting a reference engine control quantity at the dynamic pressure of "0".

To achieve the above object, there is provided in accordance with a first feature of the present invention a fuel injection control apparatus, wherein a basic injection quantity is determined at a first vehicle speed subjected to a dynamic pressure due to running air introduced from an intake duct. A vehicle speed corrective coefficient is set depending on the vehicle speed in order to reduce said basic injection quantity at a second vehicle speed which is lower than said first vehicle speed. According to the first feature, a basic injection quantity is determined while the motor vehicle is running when a dynamic pressure acts thereon, and the basic injection quantity is reduced when no dynamic pressure acts on the motor vehicle.

According to a second feature of the present invention, a throttle corrective coefficient is set so as to have its value reduced as a throttle opening is reduced in a range in which the throttle opening is smaller than a predetermined value. The vehicle speed corrective coefficient is multiplied by the throttle corrective coefficient to correct the basic injection quantity. According to the second feature, the reduction for correction in the basic injection quantity is small in a range of a small throttle opening where the difference of the dynamic pressure between the first vehicle speed and the second vehicle speed is smaller.

According to a third feature of the present invention, the injection quantity is reduced if an engine rotational speed is higher than a predetermined value. According to the third feature, an air-fuel mixture is prevented from being shifted excessively to the lean side when the engine rotational speed is low.

According to a fourth feature of the present invention, the basic injection quantity is reduced and corrected if a gear position is in a predetermined low-speed position. According to the third and fourth features, both the feeling of engine racing at lower speeds and the feeling of engine power in higher gear positions are increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 2:
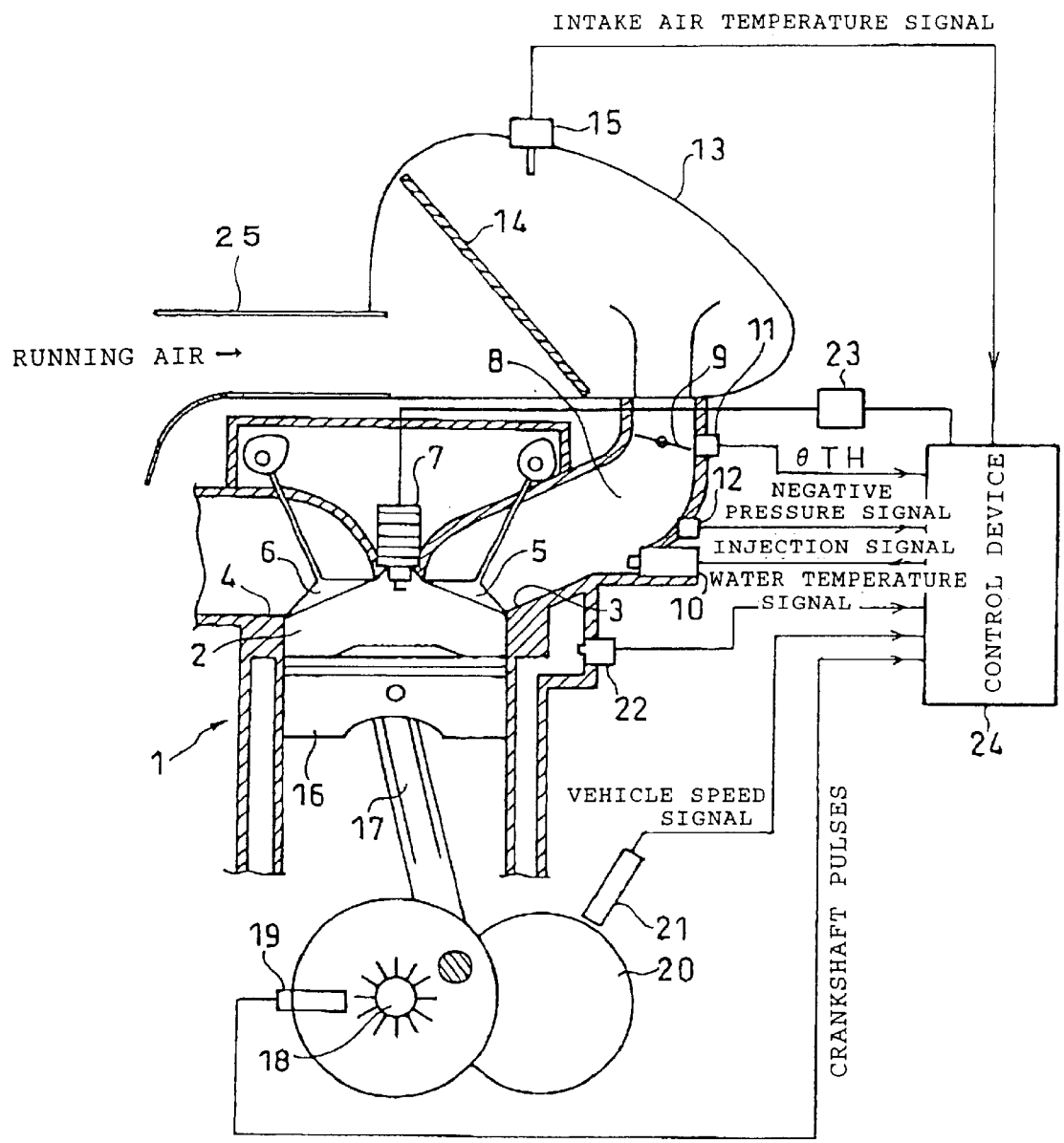
FIG. 2 is a view of an essential part of an internal combustion engine which incorporates the fuel injection control apparatus according to the present invention.

The present invention will be described below with reference to the drawings. FIG. 2 is a view of an essential part of an internal combustion engine which incorporates a fuel injection control apparatus according to an embodiment of the present invention. In FIG. 2, an intake port 3 and an exhaust port 4 are open into a combustion chamber 2 of a cylinder 1. An intake valve 5 and an exhaust valve 6 are disposed respectively in the intake port 3 and the exhaust port 4. An ignition or spark plug 7 is disposed in the combustion chamber 2.

An intake passage 8 communicating with the intake port 3 has a throttle valve 9 for adjusting the amount of intake air depending on an opening θTH of the throttle valve 9, a fuel injection valve 10, a throttle sensor 11 for detecting the opening θTH, and a negative pressure sensor 12. An air cleaner 13 is connected to the terminal end of the intake passage 8, which houses an air filter 14 for introducing air which is drawn from an intake duct 25 disposed in front of the air cleaner 13 into the intake passage 8 through the air filter 14. An intake air temperature sensor 15 is disposed in the air cleaner 13.

The cylinder 1 houses a piston 16 therein which is connected to a crankshaft 18 by a connecting rod 17. A rotational angle sensor 19 is disposed in confronting relation to the crankshaft 18 for detecting a rotational angle of the crankshaft 18 and outputting a crankshaft pulse for each given crankshaft angle. A vehicle speed sensor 21 is disposed in confronting relation to a rotatable body 20 such as a gear or the like that is coupled to the crankshaft 18. The cylinder 1 is surrounded by a water jacket having a water temperature sensor 22 for detecting the temperature of coolant that represents a temperature of the engine. An ignition coil 23 is connected to the ignition or spark plug 7.

A control device 24 comprises a microcomputer having a CPU and a memory, and has interface elements including input/output ports and an A/D converter. The control device 24 is supplied with electric energy from a battery, not shown. Output signals from the various sensors are supplied via the input ports to the control device 24. The control device 24 outputs drive signals to the fuel injection valve 10 and the ignition or spark plug 7 according to processed results based on the input signals from the sensors. The drive signal for the fuel injection valve 10 (injection signal) is a pulse signal having a pulse duration depending on an injection quantity. The fuel injection valve 10 is opened for a time corresponding to the pulse duration to inject fuel into the intake passage 8.

The pulse duration of the injection signal, i.e., the fuel injection time, is calculated based on an engine rotational speed Ne and the detected value of the throttle sensor 11 (throttle opening θTH). In this embodiment, a basic fuel injection time is reduced and corrected by a corrective coefficient of a dynamic pressure based on a speed of the vehicle and the throttle opening θTH.

Figure 3:
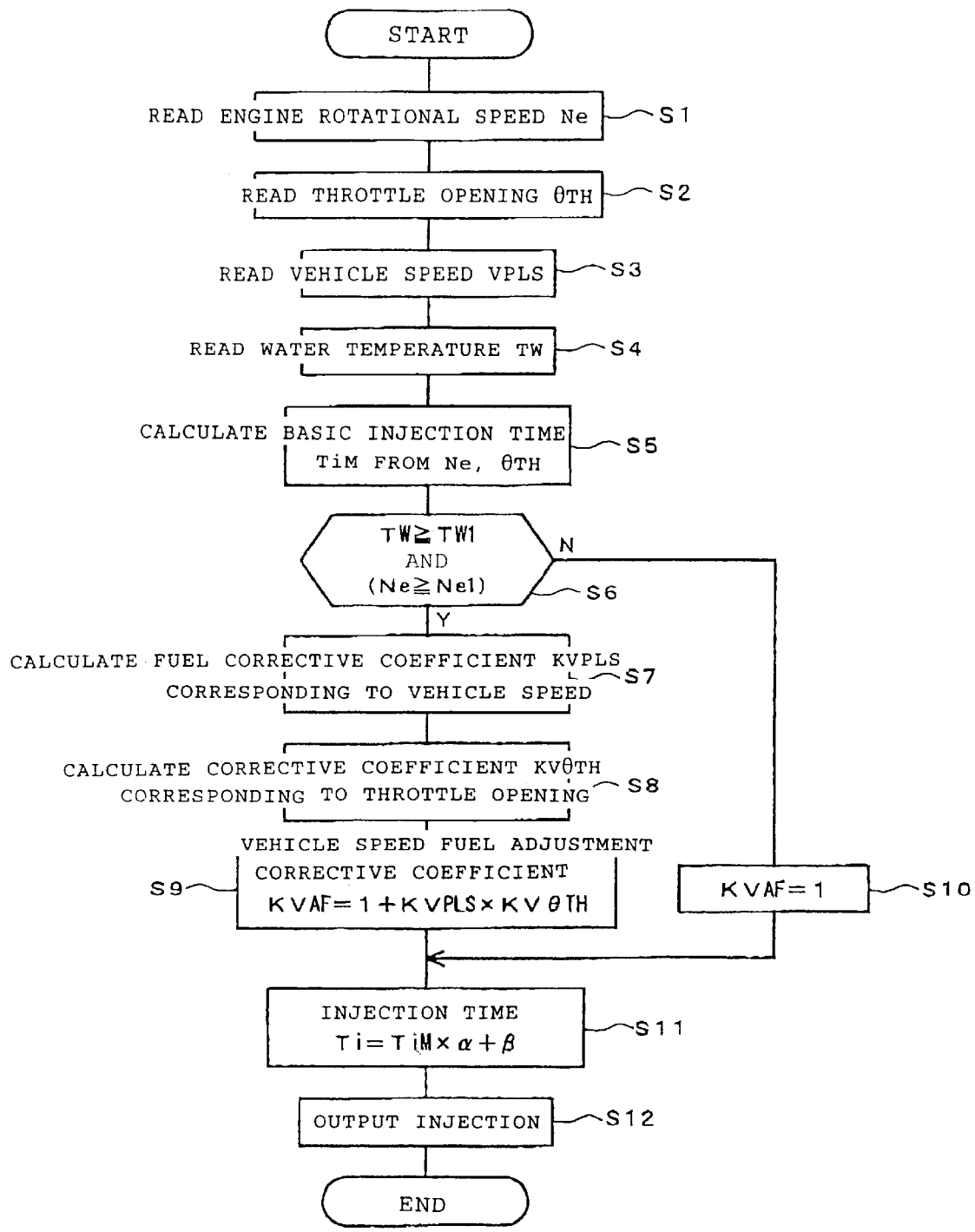
FIG. 3 is a flowchart of a fuel injection process.

FIG. 3 is a flowchart of a fuel injection process according to the present invention. In step SI, an engine rotational speed Ne is read. The engine rotational speed Ne is determined by counting crankshaft pulses outputted from the rotational angle sensor 19. In step S2, a throttle opening θTH is read. In step S3, a vehicle speed VPLS as an output signal from the vehicle speed sensor 21 is read. In step S4, an engine coolant temperature TW as an output signal from the water temperature sensor 22 is read. In step S5, a basic injection quantity TiM is calculated from the engine rotational speed Ne and the throttle opening θTH. The basic injection quantity TiM can be calculated from a map established using the engine rotational speed Ne and the throttle opening θTH as parameters. The map is established so that the basic injection time TiM fits when the vehicle speed is high, and the dynamic pressure is not "0" when the vehicle speed is high. Since the injection quantity corresponds to the injection time, the injection time will be described as representing the injection quantity.

Figure 4:
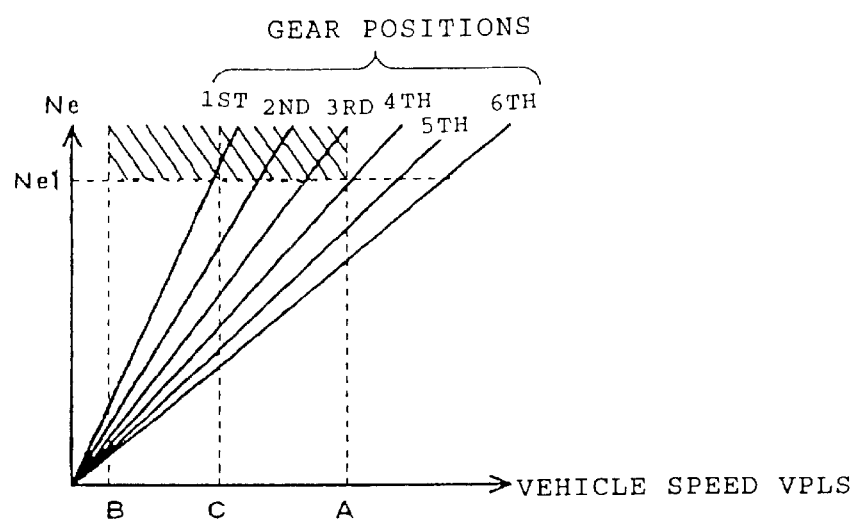
FIG. 4 is a diagram of a region for reducing and correcting a fuel injection quantity.

In step S6, it is determined whether or not the engine coolant temperature TW is equal to or higher than a preset coolant temperature TW1, that is, whether or not the engine warm-up is sufficient. At this time, it may be determined whether or not the engine rotational speed Ne is equal to or higher than a preset rotational speed Ne1. By adding this judging process, it is possible to prevent the air-fuel mixture from being shifted excessively to the lean side during low and middle rotational speed ranges in higher gear positions, and increase the feeling of engine racing during a low speed range. FIG. 4 is a table showing the relationship between the engine rotational speed Ne and the vehicle speed VPLS in each gear position. If the answer to the decision step S6 including the decision about the engine rotational speed Ne is affirmative, then the fuel injection time is reduced and corrected in the hatched region in FIG. 4. By reducing and correcting the fuel injection time only when the engine rotational speed Ne is equal to or higher than the preset rotational speed Ne1, it is possible to prevent the air-fuel mixture from being shifted excessively to the lean side when the engine rotational speed Ne is low. With the region for reducing the fuel injection time being limited to lower gear positions as shown in FIG. 4, it is possible to increase both the feeling of engine racing at lower speeds and the feeling of engine power in higher gear positions.

Figure 5:
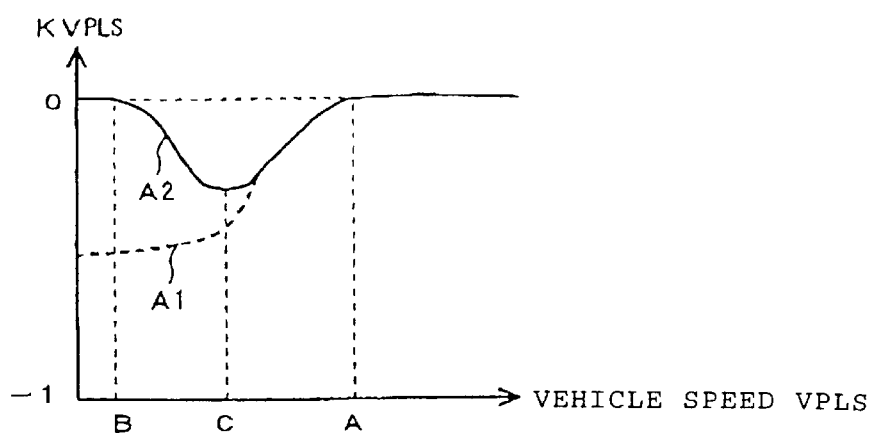
FIG. 5 is a diagram showing the relationship between a vehicle speed and a fuel corrective coefficient.

If the answer to the decision step S6 is affirmative, then control goes to step S7 to calculate a fuel corrective coefficient KVPLS corresponding to the vehicle speed VPLS. FIG. 5 is a table showing an example of the relationship between the vehicle speed VPLS and the fuel corrective coefficient KVPLS. If only the effect of running air is taken into account, then the negative extent of the fuel corrective coefficient KVPLS can be increased, achieving a curve indicated by A1 in FIG. 5. In view of the drivability of an actual motor vehicle, however, the negative extent of the fuel corrective coefficient KVPLS may not be increased at extremely low speeds, achieving a curve indicated by A2 in FIG. 5.

Figure 6:
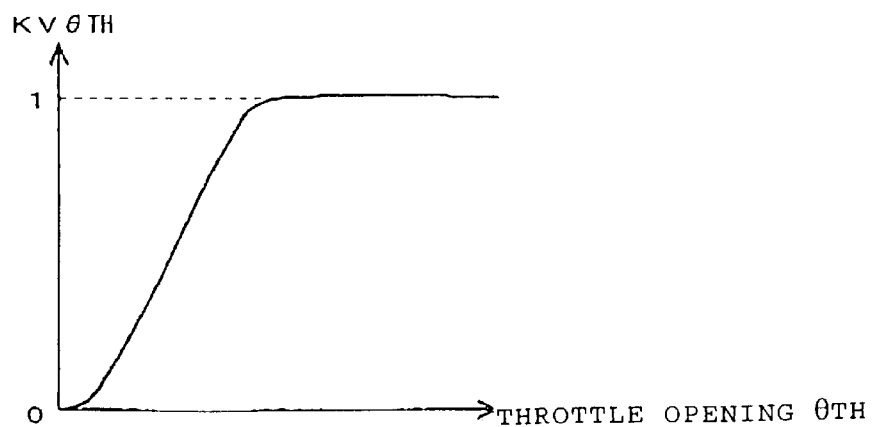
FIG. 6 is a diagram showing the relationship between a throttle opening and a corrective coefficient.

In step S8, a corrective coefficient KVθTH corresponding to the throttle opening θTH is calculated. FIG. 6 is a table showing an example of the relationship between the throttle opening θTH and the corrective coefficient KVθTH. Because the effect of running air is larger when the throttle opening θTH is greater, the corrective coefficient KVθTH has a value closer to "1" when the throttle opening θTH is greater, increasing the extent of the reduction for correction of the fuel injection time. Furthermore, the extent of the reduction for correction of the fuel injection time is reduced in a range in which the throttle opening θTH is smaller, as shown in FIG. 6.

In step S9, a vehicle speed fuel adjustment corrective coefficient KVAF is calculated using the fuel corrective coefficient KVPLS and the corrective coefficient KVθTH. The vehicle speed fuel adjustment corrective coefficient KVAF is set to a value equal to or smaller than "1." Therefore, if engine warm-up is not sufficient (negative in step S6), then control goes to step S10 to set the vehicle speed fuel adjustment corrective coefficient KVAF to "1" in order to prevent the air-fuel mixture from being shifted to the lean side.

In step S11, the basic injection time TiM is corrected by the vehicle speed fuel adjustment corrective coefficient KVAF, thus calculating an injection time Ti. A coefficient α includes an engine coolant temperature corrective coefficient, an intake air temperature corrective coefficient, and an atmospheric pressure corrective coefficient, other than the vehicle speed fuel adjustment corrective coefficient KVAF. A coefficient β includes an acceleration incremental correction time and an invalid injection time.

In step S12, a drive signal for the fuel injection valve 10 is outputted during the fuel injection time Ti. While the drive signal is being outputted, the fuel injection valve 10 is opened to inject fuel into the intake passage 8.

Figure 1:
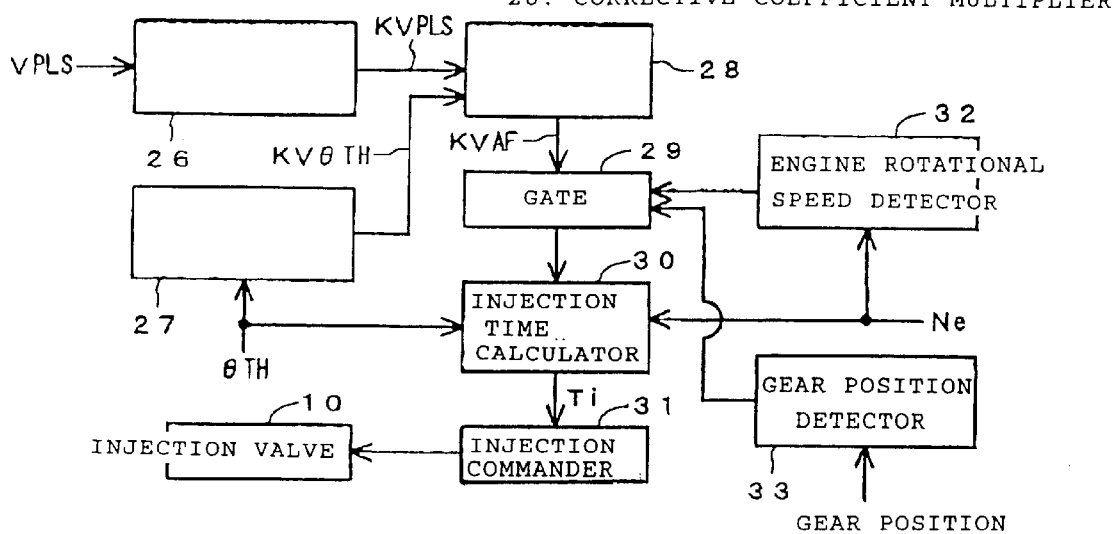
FIG. 1 is a block diagram showing essential functions of a fuel injection control apparatus according to an embodiment of the present invention.

FIG. 1 is a block diagram showing essential functions of the fuel injection control apparatus according to the embodiment of the present invention. In FIG. 1, a vehicle speed corrective coefficient calculator 26 calculates a fuel corrective coefficient KVPLS as a function of the vehicle speed VPLS based on the vehicle speed VPLS that is detected by the vehicle speed sensor 21. Specifically, the vehicle speed corrective coefficient calculator 26 may be constructed as a memory storing the table shown in FIG. 5. A throttle corrective coefficient calculator 27 calculates a corrective coefficient KVθTH as a function of the throttle opening θTH based on the throttle opening θTH that is detected by the throttle sensor 11. Specifically, the throttle corrective coefficient calculator 27 may be constructed as a memory storing the table shown in FIG. 6.

A corrective coefficient multiplier 28 multiplies the fuel corrective coefficient KVPLS and the corrective coefficient KVθTH and subtracts this obtained value from "1", thus calculating a vehicle speed fuel adjustment corrective coefficient KVAF. The vehicle speed fuel adjustment corrective coefficient KVAF is applied via a gate 29 to an injection time calculator 30. The injection time calculator 30 calculates a basic injection time TiM based on the throttle opening θTH and the engine rotational speed Ne, and also calculates a fuel injection time Ti by reading the vehicle speed fuel adjustment corrective coefficient KVAF and correcting the basic injection time TiM. An injection commander 31 supplies an injection signal having a pulse duration based on the fuel injection time Ti to the fuel injection valve 10.

An engine rotational speed detector 32 outputs a signal when the engine rotational speed Ne is equal to or higher than the preset rotational speed Ne1, and a gear position detector 33 outputs a signal when the transmission is shifted to a predetermined low gear position. The gear position detector 33 may comprise a known gear position sensor. The gate 29 may be opened in response to signals outputted from both the engine rotational speed detector 32 and the gear position detector 33, or may be opened in response to only a signal outputted from the engine rotational speed detector 32.

As described above, according to the first and second features of the present invention, a basic injection quantity is determined while the motor vehicle is running when a dynamic pressure acts thereon, and the basic injection quantity is reduced and corrected when no dynamic pressure acts on the motor vehicle. Thus, an air-fuel mixture ratio is prevented from becoming richer in the region where the dynamic pressure is small. The invention is thus useful for improving emission and fuel economy.

According to the third feature of the present invention, when an engine rotational speed is low, the injection quantity is greatly reduced and corrected, preventing an air-fuel mixture from excessively being shifted to the lean side. Therefore, the feeling of engine racing at lower speeds is increased.

According to the fourth feature of the present invention, when in higher gear positions, the injection quantity is greatly reduced and corrected, preventing an air-fuel mixture from becoming being shifted excessively to the lean side. Therefore, the feeling of engine power in higher gear positions is improved.

As described above, according to the present invention, since a fuel injection quantity is set while the motor vehicle is actually running under a dynamic pressure and the intake duct does not need to be removed for settings, the accuracy with which to calculate the basic injection quantity is increased, and the drivability in a high speed range is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control apparatus for calculating a basic injection quantity for fuel supplied to an engine that has an intake duct open in a direction of travel of a motor vehicle, said fuel injection control apparatus comprising:

means for determining a basic injection quantity at a first vehicle speed subjected to a dynamic pressure due to running air introduced from the intake duct; and means for setting a vehicle speed corrective coefficient depending on the vehicle speed in order to reduce the basic injection quantity at a second vehicle speed lower than said first vehicle speed.

2. The fuel injection control apparatus according to claim 1, further comprising:

throttle opening detecting means for detecting an opening of the throttle;

means for setting a throttle corrective coefficient so as to have a reduced value when the throttle opening is reduced to a range in which the throttle opening is smaller than a predetermined value; and means for multiplying the vehicle speed corrective coefficient and throttle corrective coefficient to correct the basic injection quantity.

3. The fuel injection control apparatus according to claim 2, further comprising:

engine rotational speed detecting means; and means for reducing and correcting the basic injection quantity if an engine rotational speed is higher than a predetermined value.

4. The fuel injection control apparatus according to claim 3, further comprising:

gear position detecting means; and means for reducing the basic injection quantity if the gear position is at a predetermined low-speed position.

5. The fuel injection control apparatus according to claim 2, further comprising:

means for detecting an engine coolant temperature;

means for determining if the engine coolant temperature is equal to or higher to a preset coolant temperature to determine if engine warm-up is sufficient; and means for preventing said means for setting from operating if the engine coolant temperature is below the preset coolant temperature.

6. The fuel injection control apparatus according to claim 1, further comprising:

engine rotational speed detecting means; and means for reducing and correcting the basic injection quantity if an engine rotational speed is higher than a predetermined value.

7. The fuel injection control apparatus according to claim 6, further comprising:

gear position detecting means; and means for reducing the basic injection quantity if the gear position is at a predetermined low-speed position.

8. The fuel injection control apparatus according to claim 6, further comprising:
 means for detecting an engine coolant temperature;
 means for determining if the engine coolant temperature is equal to or higher to a preset coolant temperature to determine if engine warm-up is sufficient; and
 means for preventing said means for setting from operating if the engine coolant temperature is below the preset coolant temperature.

9. The fuel injection control apparatus according to claim 1, further comprising:
 means for detecting an engine coolant temperature;
 means for determining if the engine coolant temperature is equal to or higher to a preset coolant temperature to determine if engine warm-up is sufficient; and
 means for preventing said means for setting from operating if the engine coolant temperature is below the preset coolant temperature.

10. The fuel injection control apparatus according to claim 1, wherein the basic injection quantity is determined from a speed of the engine and a throttle opening of the engine.

11. A method for calculating a basic injection quantity for fuel supplied to an engine that has an intake duct open in a direction of travel of a motor vehicle, said method comprising the steps of:
 determining a basic injection quantity at a first vehicle speed subjected to a dynamic pressure due to running air introduced from the intake duct; and
 setting a vehicle speed corrective coefficient depending on the vehicle speed in order to reduce the basic injection quantity at a second vehicle speed lower than said first vehicle speed.

12. The method according to claim 11, further comprising the steps of:
 detecting an opening of the throttle;
 setting a throttle corrective coefficient so as to have a reduced value when the throttle opening is reduced to a range in which the throttle opening is smaller than a predetermined value; and
 multiplying the vehicle speed corrective coefficient and throttle corrective coefficient to correct the basic injection quantity.

13. The method according to claim 12, further comprising the steps of:
 detecting the engine rotational speed; and
 reducing and correcting the basic injection quantity if an engine rotational speed is higher than a predetermined value.

14. The method according to claim 13, further comprising the steps of:
 detecting a position of a gear; and
 reducing the basic injection quantity if the gear position is at a predetermined low-speed position.

15. The method according to claim 12, further comprising the steps of:
 detecting an engine coolant temperature;
 determining if the engine coolant temperature is equal to or higher to a preset coolant temperature to determine if engine warm-up is sufficient; and
 preventing said means for setting from operating if the engine coolant temperature is below the preset coolant temperature.

16. The method according to claim 11, further comprising the steps of:
 detecting the engine rotational speed; and reducing and correcting the basic injection quantity if an engine rotational speed is
 higher than a predetermined value.

17. The method according to claim 16, further comprising the steps of:
 detecting a position of a gear; and
 reducing the basic injection quantity if the gear position is at a predetermined low-speed position.

18. The method according to claim 16, further comprising the steps
 detecting an engine coolant temperature;
 determining if the engine coolant temperature is equal to or higher to a preset coolant temperature to determine if engine warm-up is sufficient; and
 preventing said means for setting from operating if the engine coolant temperature is below the preset coolant temperature.

19. The method according to claim 11, further comprising the steps of:
 detecting an engine coolant temperature;
 determining if the engine coolant temperature is equal to or higher to a preset coolant temperature to determine if engine warm-up is sufficient; and
 preventing said means for setting from operating if the engine coolant temperature is below the preset coolant temperature.

20. The method according to claim 11, wherein the basic injection quantity is, determined from a speed of the engine and a throttle opening of the engine.

* * * * *